US009434435B2

(12) United States Patent
Ito (10) Patent No.: US 9,434,435 B2
(45) Date of Patent: Sep. 6, 2016

(54) SEAT STRUCTURE FOR MOTORCYCLE (71) Applicant: KAWASAKI JUKOGYO KABUSHIKI KAISHA, Kobe-shi, Hyogo (JP)

(72) Inventor: Koji Ito, Akashi (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 0 days.

(21) Appl. No.: 14/650,254

(22) PCT Filed: Jul. 22, 2013

(86) PCT No.: PCT/JP2013/004455
§ 371 (c)(1),
(2) Date: Jun. 5, 2015

(87) PCT Pub. No.: WO2014/087554
PCT Pub. Date: Jun. 12, 2014

(65) Prior Publication Data
US 2015/0321717 A1    Nov. 12, 2015

(30) Foreign Application Priority Data

Dec. 6, 2012    (JP) ................................. 2012-267621

(51) Int. Cl.
*B62J 1/00*    (2006.01)
*B62J 1/08*    (2006.01)
(Continued)

(52) U.S. Cl.
CPC    *B62J 1/005* (2013.01); *B62J 1/08* (2013.01); *B62J 1/12* (2013.01); *B62J 1/28* (2013.01)

(58) Field of Classification Search
CPC ............... B62J 1/005; B62J 1/08; B62J 1/28

USPC .............. 180/219, 218, 220; 297/201, 195.1, 297/195.12, 195.13, 215.1
See application file for complete search history.

(56) References Cited

U.S. PATENT DOCUMENTS 4,506,754 A * 3/1985 Hirano ....................... B62J 1/28
                                                   180/219
5,697,671 A   12/1997 Shavitz
(Continued)

FOREIGN PATENT DOCUMENTS

JP    H04331676 A    11/1992
JP    H0572315 A     10/1993
(Continued)

OTHER PUBLICATIONS

ISA Japanese Patent Office, International Search Report Issued in Patent Application No. PCT/JP2013/004455, Oct. 22, 2013, WIPO, 4 pages.
(Continued)

*Primary Examiner* — Tony Winner
(74) *Attorney, Agent, or Firm* — Alleman Hall McCoy Russell & Tuttle LLP (57) ABSTRACT

A motorcycle comprises a vehicle body frame; a front seat including a front seat body section on which a rider is to be seated, and a protruding section protruding rearward from the front seat body section; a rear seat including a rear seat body section on which a passenger is to be seated, and a recessed section which is provided in a front portion of the rear seat body section and opened upward and forward; and a seat lock device mounted to the vehicle body frame. In a state in which a front portion of the rear seat is placed over the vehicle body frame from above, the protruding section of the front seat is accommodated into the recessed section of the rear seat and presses the recessed section from above, and the front seat is locked by the seat lock device.

6 Claims, 12 Drawing Sheets

(51) Int. Cl.
*B62J 1/28* (2006.01)
*B62J 1/12* (2006.01)

(56) References Cited

U.S. PATENT DOCUMENTS

| | | | | |
|---|---|---|---|---|
| 6,070,896 | A * | 6/2000 | Saiki | B62J 1/14 280/288.4 |
| 6,648,408 | B1 | 11/2003 | Grove | |
| 7,992,885 | B2 * | 8/2011 | Ishikawa | B62J 25/00 180/219 |
| 8,376,455 | B2 * | 2/2013 | Inoue | B62J 1/12 180/219 |
| 9,027,992 | B2 * | 5/2015 | Kawatani | B62J 1/12 297/195.12 |
| 2006/0065458 | A1 * | 3/2006 | Wachigai | B62K 11/00 180/219 |
| 2007/0018488 | A1 * | 1/2007 | Hein | B62J 1/12 297/195.12 |
| 2012/0234619 | A1 * | 9/2012 | Nakagome | B62J 35/00 180/219 |
| 2015/0175229 | A1 * | 6/2015 | Chiba | B62J 1/12 297/452.18 |
| 2015/0197298 | A1 * | 7/2015 | Sasaki | B62J 1/08 297/215.14 |

FOREIGN PATENT DOCUMENTS

| | | |
|---|---|---|
| JP | H11208548 A | 8/1999 |
| JP | 2001010572 A | 1/2001 |
| JP | 2002362449 A | 12/2002 |
| JP | 2007050822 A | 3/2007 |
| JP | 2009262845 A | 11/2009 |

OTHER PUBLICATIONS

European Patent Office, Extended European Search Report Issued in Application No. 13861339.3, Jun. 13, 2016, Germany, 9 pages.

* cited by examiner

SEAT STRUCTURE FOR MOTORCYCLE

TECHNICAL FIELD

The present invention relates to a motorcycle comprising a separate seat including a front seat for a rider and a rear seat for a passenger which are separable from each other.

BACKGROUND ART

In a conventional example, a motorcycle includes a separate seat including a front rider seat and a rear passenger seat which are separable from each other. Typically, the front seat and the rear seat are independently mounted to a vehicle body frame. For example, in a motorcycle disclosed in Patent Literature 1, the rear portion of the rear seat is engaged with a rear frame, while the front portion of the rear seat is mounted to the rear frame via a seat lock.

CITATION LIST

Patent Literature

Patent Literature 1: Japanese Laid-Open Patent Application Publication No. 2009-262845

SUMMARY OF INVENTION

Technical Problem

However, in the above conventional motorcycle, since the front seat and the rear seat are independently mounted to the frame, an operation for mounting and detaching the seats is complex, and the external appearance of the seats is not good.

The present invention has been developed to solve the above mentioned problem, and an object of the present invention is to provide a motorcycle including a separate seat which can be easily detachably mounted to a vehicle body, and being capable of improving the external appearance of front and rear seats of the separate seat.

Solution to Problem

To achieve the above described object, the present invention provides a motorcycle comprising: a vehicle body frame; a front seat including a front seat body section on which a rider is to be seated, and a protruding section protruding rearward from the front seat body section; a rear seat including a rear seat body section on which a passenger is to be seated, and a recessed section which is provided in a front portion of the rear seat body section and opened upward and forward; and a seat lock device mounted to the vehicle body frame, wherein in a state in which a front portion of the rear seat is placed over the vehicle body frame from above such that the front portion of the rear seat is movable upward from the vehicle body frame, the protruding section of the front seat is accommodated into the recessed section of the rear seat and presses the recessed section from above, and the front seat is locked by the seat lock device.

In accordance with this configuration, the front portion of the rear seat is retained by the protruding section of the front seat without being fastened to the vehicle body frame. Therefore, the mounting structure of the rear seat can be simplified, and the rear seat can be mounted more easily. Since the front seat and the rear seat which are separate members overlap with each other, they have an external appearance without discontinuity. Thus, the external appearance of the front and rear seats can be improved.

The front seat includes a bottom plate made of a resin, and a reinforcement plate made of metal and fastened to a portion of the bottom plate to correspond to at least the protruding section.

In this configuration, since the protruding section of the front seat which presses the recessed section of the rear seat is reinforced by the reinforcement plate, the front seat is able to firmly retain the rear seat even when a force for moving the rear seat upward is applied to the rear seat.

A seat band which is to be gripped by a passenger is attached to the protruding section of the front seat.

In this configuration, the seat band can be located forward relative to and at a distance from the passenger. Therefore, the passenger can easily grip the seat band.

The front seat includes a bottom plate made of a resin, and a reinforcement plate made of metal and fastened to a portion of the bottom plate to correspond to at least the protruding section, and the seat band, the reinforcement plate, and the bottom plate are fastened together by a common fastening member.

In this configuration, it becomes possible to reduce the members by which the seat band and the reinforcement plate are mounted to each other, and easily perform the operation for mounting the seat band and the reinforcement plate to each other.

The protruding section includes an upward protruding portion protruding rearward and upward from the front seat body section, and an extending portion protruding rearward from the upward protruding portion at an angle with respect to a horizontal direction which is smaller than an angle of the upward protruding portion with respect to the horizontal direction.

In this configuration, the protruding section of the front seat can be made continuous with the rear seat which is located higher than the front seat without degrading the external appearance.

The extending portion and the recessed section have a V-shape when viewed from above, with a width decreased in a rearward direction.

In accordance with this configuration, the boundary between the front seat and the rear seat can be improved.

The protruding section is provided on a lower surface thereof with a projection projecting downward, and the recessed section is provided with a fitting hole into which the projection is fitted.

In this configuration, the front seat can be positioned with respect to the rear seat, and the fixed shape of the boundary between the front seat and the rear seat can be maintained. In addition, the operation for locking the front seat with the seat lock device can be performed stably.

Advantageous Effects of Invention

The present invention is configured as described above, and can achieve an advantage that it is possible to provide a motorcycle including a separate seat which can be easily detachably mounted to a vehicle body, and being capable of improving the external appearance of front and rear seats of the separate seat.

The above and further objects and features of the invention will more fully be apparent from the following detailed description with accompanying drawings.

DESCRIPTION OF EMBODIMENTS

Now, the embodiment of the present invention will be described with reference to the accompanying drawings. Hereinafter, the stated directions are referenced from the perspective of a rider riding a motorcycle.

Figure 1:
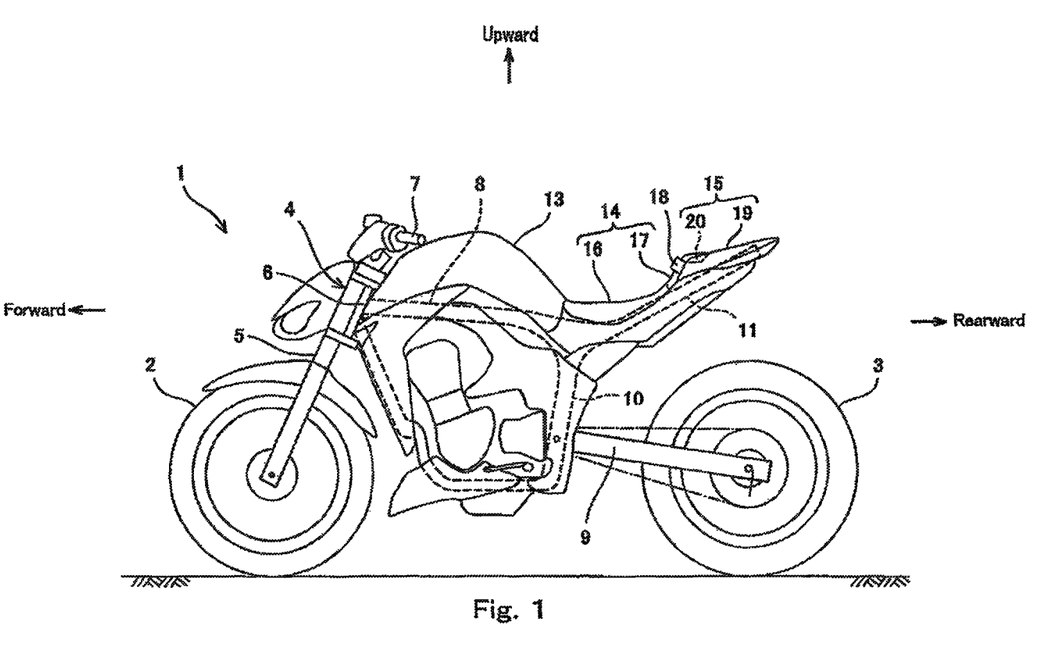
FIG. 1 is a left side view of a motorcycle according to the embodiment of the present invention.

FIG. 1 is a left side view of a motorcycle according to the embodiment of the present invention. As shown in FIG. 1, the motorcycle 1 includes a front wheel 2, a rear wheel 3, and a vehicle body frame 4. The front wheel 2 is rotatably mounted to the lower end portion of a front fork 5 extending substantially vertically. The front fork 5 is mounted to a steering shaft (not shown) via an upper bracket (not shown) provided at an upper end portion thereof. The steering shaft is rotatably supported on a head pipe 6 which is a constituent member of the vehicle body frame 4. A bar-type steering handle 7 extending in a rightward and leftward direction is attached to the upper bracket. When the rider rotates the steering handle 7, the direction of the front wheel 2 can be turned as desired around the steering shaft as a rotary shaft.

The vehicle body frame 4 includes the head pipe 6, a pair of right and left main frames 8 extending rearward from the head pipe 6, and a pair of right and left pivot frames 10 which extend continuously from the rear portions of the main frames 8, respectively, and to which the front end portion of a swing arm 9 is mounted such that the swing arm 9 is pivotable, and a pair of right and left seat rails 11 extending rearward from the pivot frames 10, respectively.

A fuel tank 13 is located rearward relative to the steering handle 7 and fastened to the main frames 8. A front rider seat 14 and a rear passenger seat 15 are located rearward relative to the fuel tank 13 and detachably mounted to the seat rails 11.

The front seat 14 includes a front seat body section 16 on which the rider is to be seated, and a protruding section 17 protruding rearward from the front seat body section 16. A seat band 18 to be gripped by the passenger is attached to the protruding section 17.

The rear seat 15 includes a rear seat body section 19 on which the passenger is to be seated, and a recessed section 20 which is provided in the front portion of the rear seat body section 19 and opened upward and forward. The protruding section 17 of the front seat 14 is placed to overlap with the recessed section 20 of the rear seat 15 from above.

Figure 2:
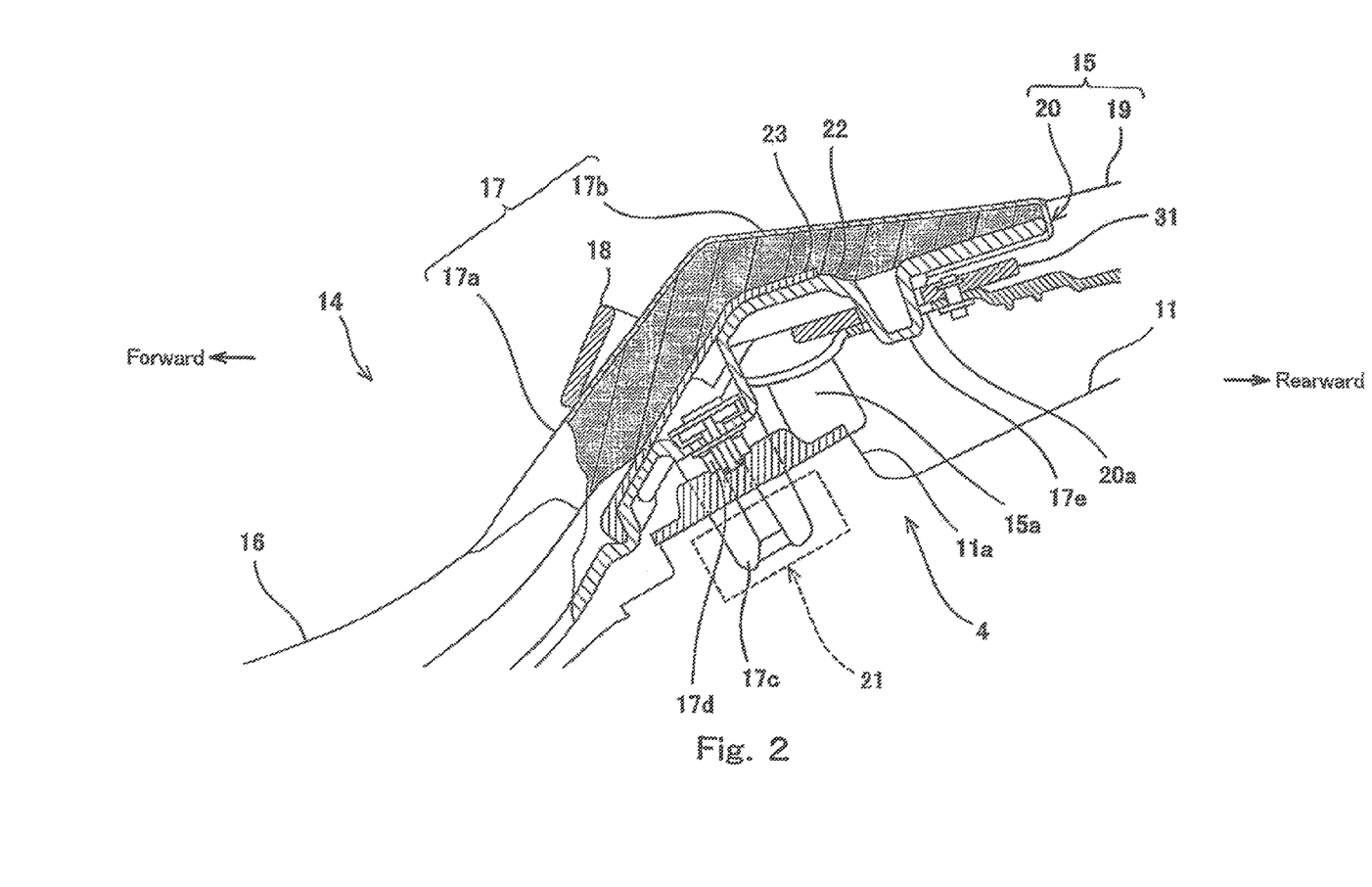
FIG. 2 is a cross-sectional view showing a protruding section of a front seat and a recessed section of a rear seat of the motorcycle of FIG. 1.

FIG. 2 is a cross-sectional view showing the protruding section 17 of the front seat 14 and the recessed section 20 of the rear seat 15 in the motorcycle 1 of FIG. 1. As shown in FIG. 2, the protruding section 17 of the front seat 14 includes an upward protruding portion 17a protruding rearward and upward from the front seat body section 16, and an extending portion 17b protruding rearward from the upward protruding portion 17a at an angle with respect to a horizontal direction which is smaller than the angle of the upward protruding portion 17a with respect to the horizontal direction. This allows the protruding section 17 of the front seat 14 to be continuous with the rear seat 15 located higher than the front seat 14 without degrading the external appearance. In the present embodiment, the seat band 18 is attached to the upward protruding portion 17a of the protruding section 17. This allows the seat band 18 to be located forward relative to and at a distance from the passenger seated on the rear seat body section 19. Therefore, the passenger can easily grip the seat band 18.

The upward protruding portion 17a of the front seat 14 is provided on a lower surface thereof with an engagement portion 17c of a frame shape which is engageable with a seat lock device 21. The engagement portion 17c is fastened to the seat lock device 21 by a fastening member 17d. The extending portion 17b is provided on a lower surface thereof with a projection 17e projecting downward. In the present embodiment, the projection 17e is integrated with a bottom plate 22 of the front seat 14. The recessed section 20 of the rear seat 15 has a fitting hole 20a into which the projection 17e of the front seat 14 is fitted. In the present embodiment, a plate 31 is placed on the bottom surface of the recessed section 20.

The front portion of the rear seat 15 is placed over the seat rails 11 from above such that the front portion of the rear seat 15 is movable upward from the seat rails 11. In the present embodiment, leg portions 15a provided on the bottom surface of the front end portion of the rear seat 15 are placed on a cross member 11a provided on the pair of right and left seat rails 11. The lower surfaces of the leg portions 15a have stepped portions, respectively. The stepped portions of the lower surfaces of the leg portions 15a are configured to contact the cross member 11a so that the rear seat 15 is positioned not to move forward and downward. In this state, the protruding section 17 of the front seat 14 is accommodated in the recessed section 20 of the rear seat 15 and presses the recessed section 20 from above. In the present embodiment, the projection 17e is fitted into the fitting hole 20a of the recessed section 20. The seat lock device 21 locks the engagement portion 17c of the front seat 14.

In the above configuration, the front portion of the rear seat 15 is retained by the protruding section 17 of the front seat 14 without being fastened to the seat rails 11. Therefore, the mounting structure of the rear seat 15 can be simplified, and the rear seat 15 can be mounted more easily. Since the front seat 14 and the rear seat 15 which are separate members overlap with each other, they have an external appearance without discontinuity. Thus, the external appearance of the front and rear seats can be improved.

As shown in FIG. 2, the front seat 14 includes the bottom plate 22 made of a resin, a cushion member (not shown) placed on the bottom plate 22, and a reinforcement plate 23 made of metal and fastened to a portion of the bottom plate 22 to correspond to at least the protruding section 17. The front seat 14 is covered with an outer cover member. Since the protruding section 17 of the front seat 14 which presses the recessed section 20 of the rear seat 15 is reinforced by the reinforcement plate 23, the front seat 14 is able to firmly retain the rear seat 15 even when a force for moving the rear seat 15 upward is applied to the rear seat 15.

Figure 3:
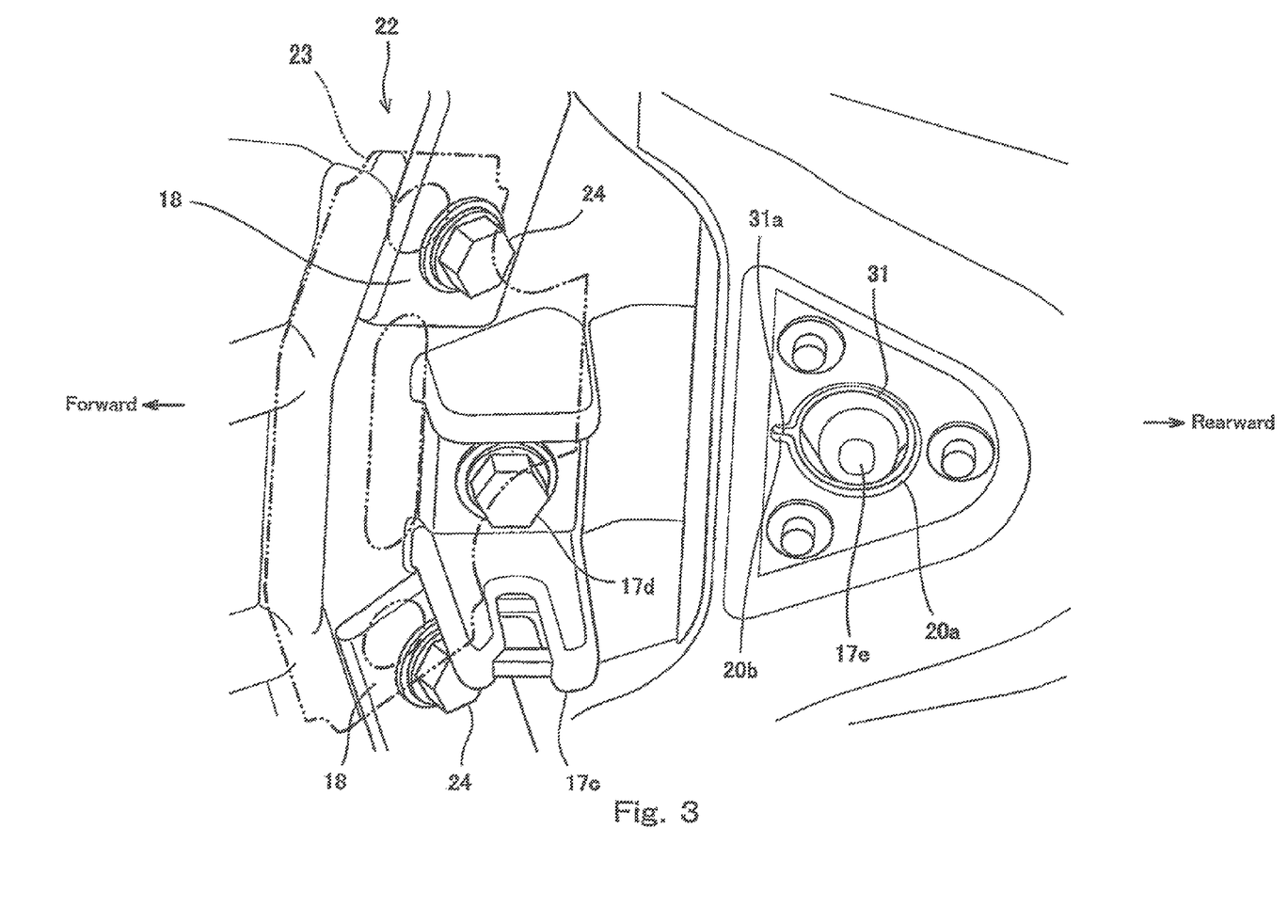
FIG. 3 is a view showing a joint portion at which the rear seat and the front seat of FIG. 2 are joined to each other, when viewed from below.

FIG. 3 is a view showing a joint portion at which the rear seat 15 and the front seat 14 of FIG. 2 are joined to each other, when viewed from below. As shown in FIG. 3, the projection 17e of the front seat 14 is fitted into the fitting hole 20a of the rear seat 15. Thereby, the front seat 14 can be positioned with respect to the rear seat 15, and the fixed shape of the boundary between the front seat 14 and the rear seat 15 can be maintained. Therefore, the external appearance of the seats can be improved. In the present embodiment, a recessed portion 20b is provided on a portion of the periphery of the fitting hole 20a, and the plate 31 placed on the bottom surface of the recessed section 20 is provided with a convex portion 31a which protrudes laterally and is fitted to the recessed portion 20b so that the plate 31 is positioned in a circumferential direction. In the front seat 14, the seat band 18, the bottom plate 22, and the reinforcement plate 23 are fastened together by common fastening members 24. In the present embodiment, the seat band 18, the bottom plate 22, and the reinforcement plate 23 are bolted together by the two fastening members 24, at right and left locations. This makes it possible to reduce the members by which the seat band 18 and the reinforcement plate 23 are mounted to each other, and easily perform the operation for mounting the seat band 18 and the reinforcement plate 23 to each other.

Figure 4:
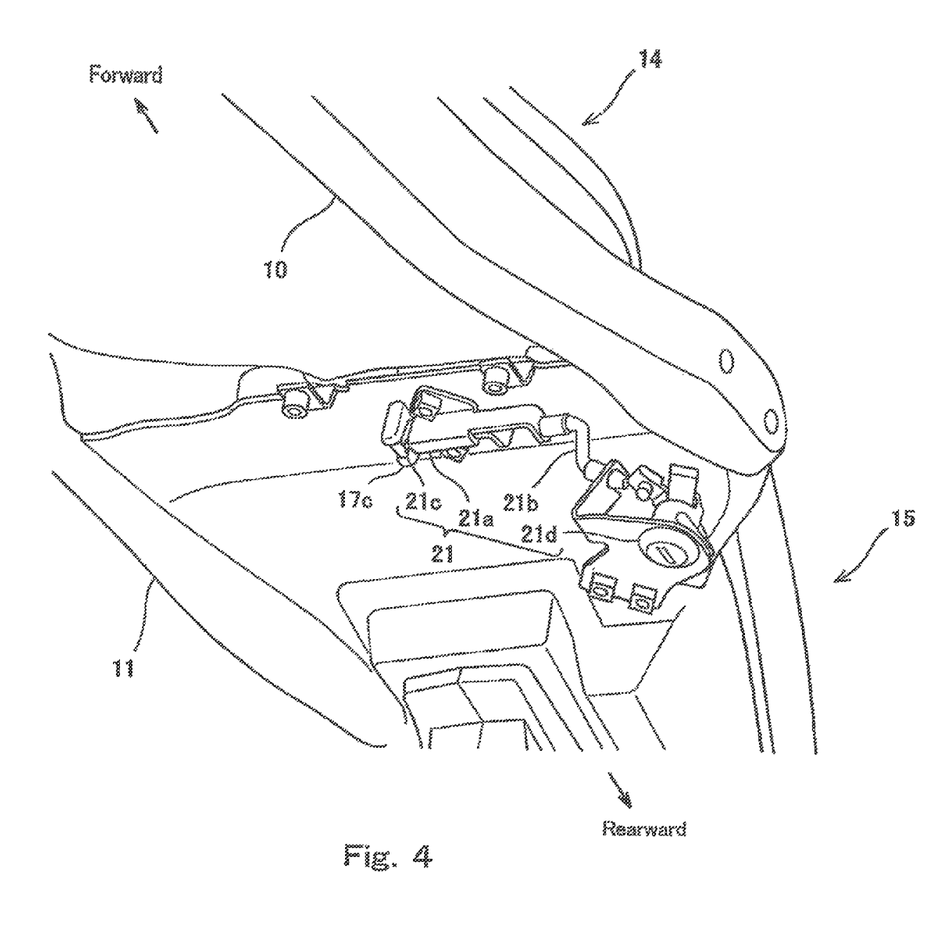
FIG. 4 is a view showing a seat lock device which places the front seat of FIG. 2 in a locked state, when viewed from below.

FIG. 4 is a view showing the seat lock device 21 which places the front seat 14 in a locked state, when viewed from below. As shown in FIG. 4, the seat lock device 21 includes a stay 21a fastened to the vehicle body, a wire cable 21b supported on the stay 21a, a lock pin 21c connected to one end of the wire cable 21b, a spring (not shown) which biases the lock pin 21c to protrude the lock pin 21c, and a key cylinder 21d connected to the other end of the wire cable 21b via a link. The key cylinder 21d has a key insertion hole facing downward. For this reason, the key insertion hole of the key cylinder 21d is not easily found by a third party, and therefore the motorcycle is less likely to be stolen. The seat lock device 21 locks the front seat 14 by fitting the lock pin 21c into a communication hole provided in the engagement portion 17c of the frame shape. When the seat lock device 21 is unlocked, the key inserted into the key insertion hole of the key cylinder 21d is rotated to pull the lock pin 21c out of the engagement portion 17c via the wire cable 21b. As shown in FIG. 3, since the projection 17e of the front seat 14 is fitted into the fitting hole 20a of the rear seat 15, the operation for locking the front seat 14 and the seat lock device 21 can be carried out stably.

Figure 5:
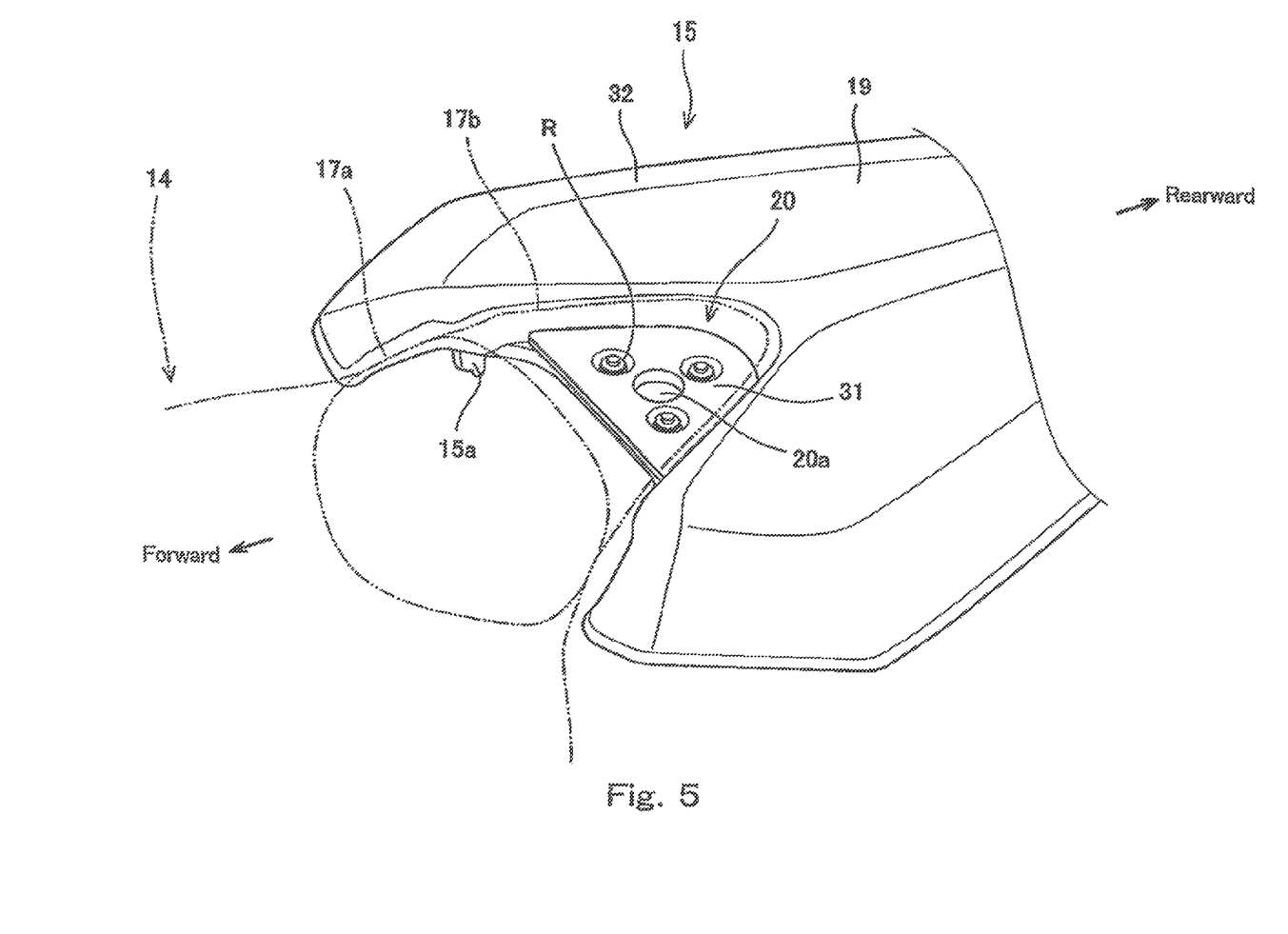
FIG. 5 is a perspective view showing the rear seat and the front seat of the motorcycle of FIG. 1.

FIG. 5 is a perspective view showing the rear seat 15 and the front seat 14. As shown in FIG. 5, the rear seat 15 includes the rear seat body section 19 on which the passenger is to be seated, and the recessed section 20 which is provided in the front portion of the rear seat body section 19 and opened upward and forward. In the present embodiment, the plate 31 for positioning, which has a substantially triangular shape, is disposed to cover the bottom portion of the recessed section 20. The fitting hole 20a is provided in the center portion of the plate 31, and a region of the plate 31 around the fitting hole 20a is fastened to the recessed section 20 by three rivets R. The recessed section 20 and the extending portion 17b of the front seat 14 which is indicated by a two-dotted line has a V-shape when viewed from above, with a width decreased in a rearward direction. This can improve the external appearance of the boundary between the front seat 14 and the rear seat 15.

Figure 6:
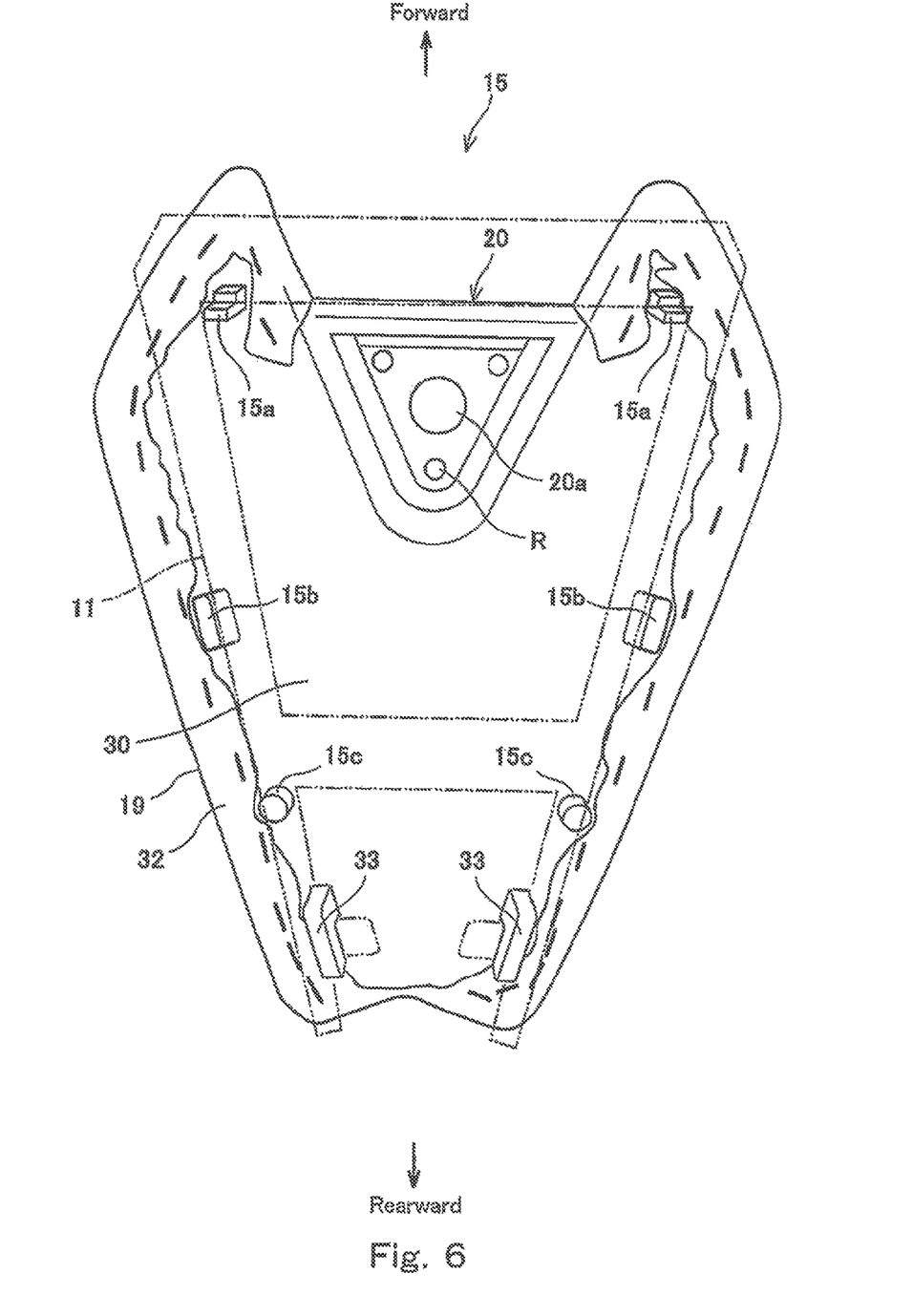
FIG. 6 is a bottom view showing the rear seat of FIG. 5, when viewed from below.

FIG. 6 is a bottom view showing the rear seat 15 of FIG. 5, when viewed from below. As shown in FIG. 6, the rear seat body section 19 of the rear seat 15 includes a bottom plate 30 made of a resin and the outer cover member 32 placed on the bottom plate 30 to cover a cushion member (not shown). The outer cover member 32 is fastened to the bottom plate 30 by a plurality of staples at the reverse side of the rear seat 15. The bottom plate 30 has the fitting hole 20a penetrating therethrough from the recessed section 20 at the obverse side to the reverse side of the bottom plate 30. The rivets R penetrating the bottom plate 30 to the reverse side are provided around the fitting hole 20a to fasten the plate 31 (see FIG. 5) to the recessed section 20 (see FIG. 5).

The bottom plate 30 further includes the pair of right and left leg portions 15a which are provided at the front end portion of the bottom surface and each of which has a stepped portion, a pair of right and left engagement portions 15b which are provided on the bottom surface in a location that is slightly forward relative to the center in the forward and rearward direction, and engaged with the seat rails 11 (a two-dotted line in FIG. 6) to position the rear seat 15 in a rightward and leftward direction, respectively, a pair of right and left projections 15c which are provided on the bottom surface in a location that is slightly rearward relative to the center in the forward and rearward direction to set the height of the rear seat 15, and a pair of right and left hooks 33 provided at the rear end portion of the bottom surface to engage the rear seat 15 with the seat rails 11 (the two-dotted line in FIG. 6). In the present embodiment, the leg portions 15a, the engagement portions 15b, the projections 15c, and the hooks 33 are unitarily provided on the bottom plate 30.

Figure 7:
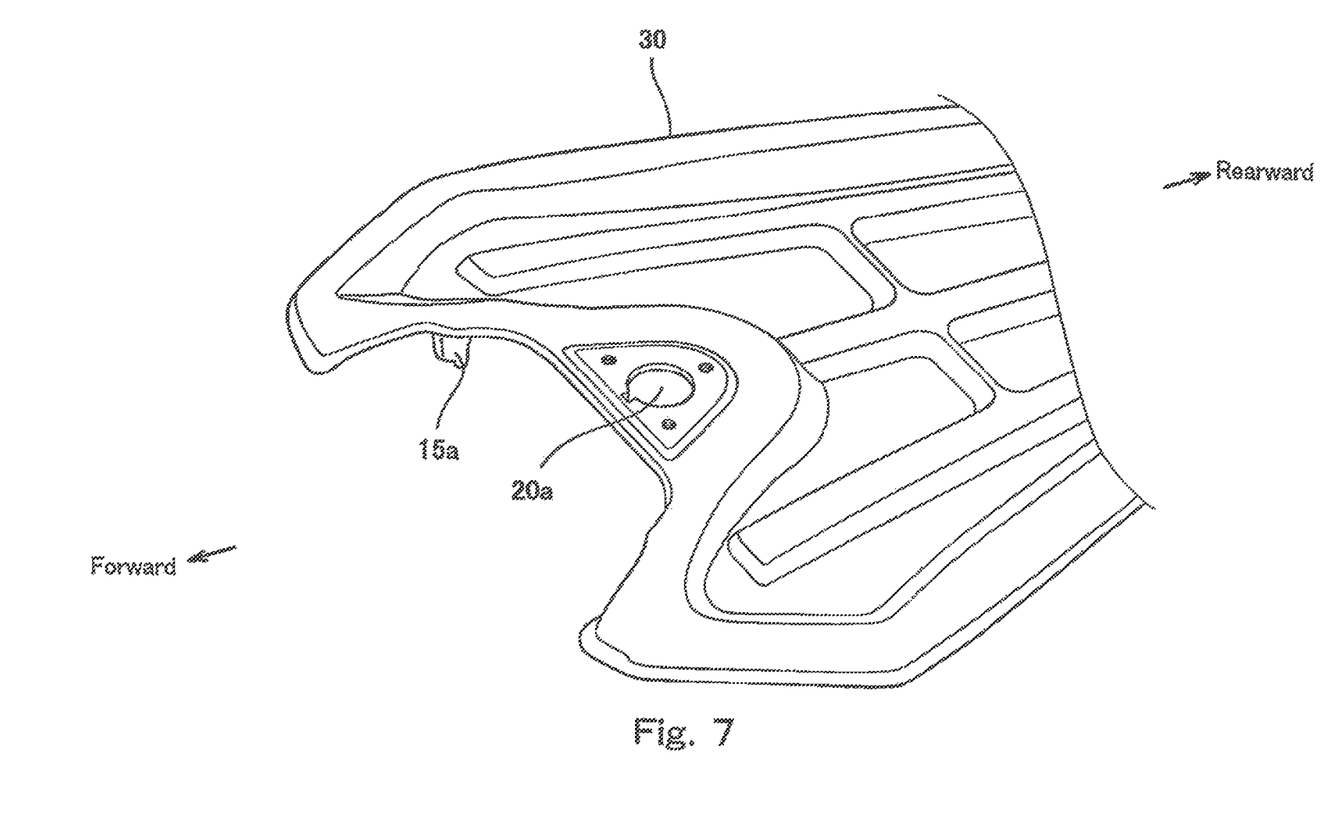
FIG. 7 is a perspective view showing a bottom plate of the rear seat of FIG. 5.
Figure 8:
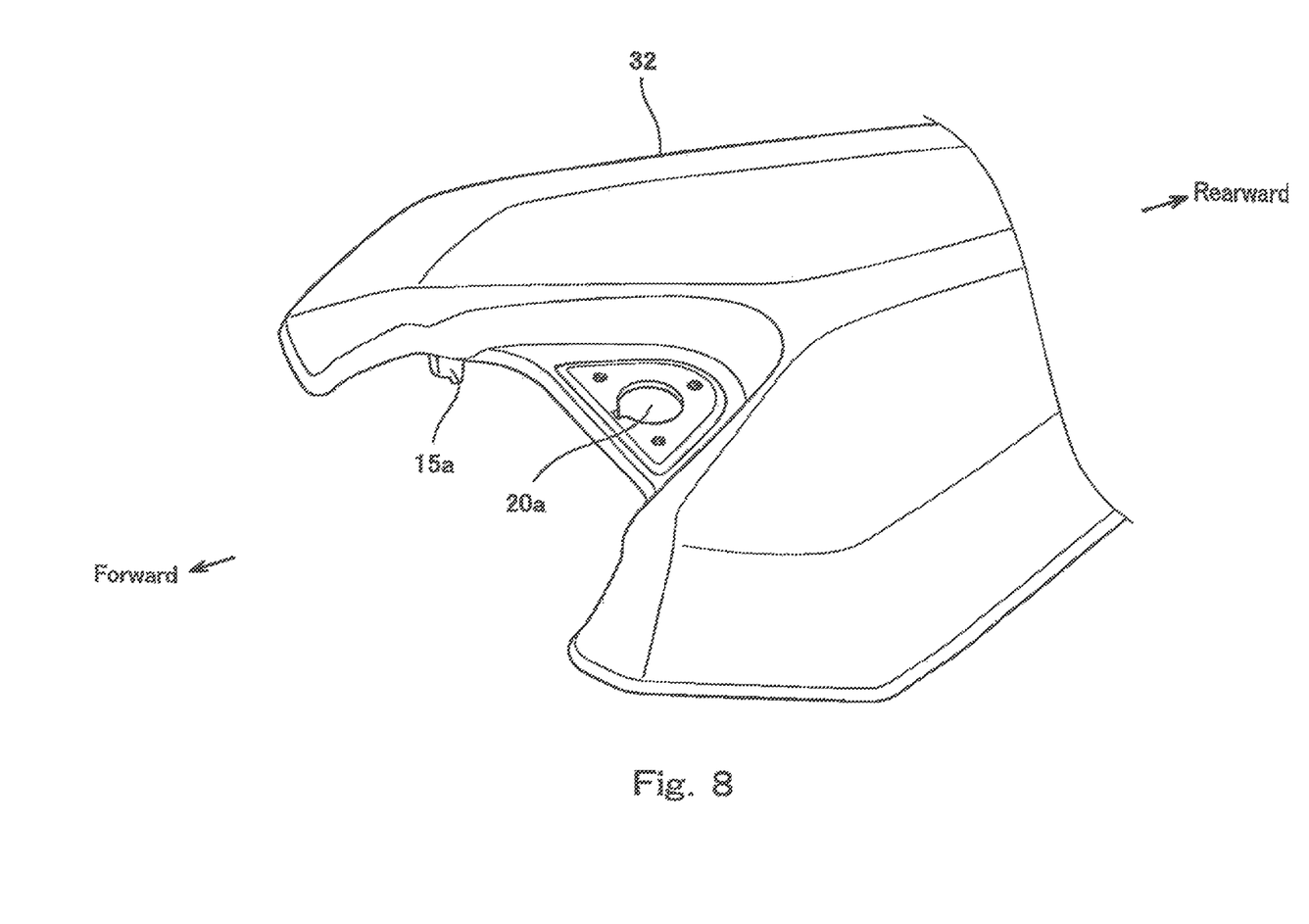
FIG. 8 is a perspective view showing a state in which an outer cover member is placed over the bottom plate of the rear seat of FIG. 5.

Next, the procedure for manufacturing the rear seat 15 will be described with reference to FIGS. 7 and 8, in addition to FIGS. 1 to 6. Initially, the bottom plate 30 of the rear seat 15 is formed. FIG. 7 is a perspective view showing the bottom plate 30 of the rear seat 15. The bottom plate 30 is manufactured by using, for example, a synthetic resin. The fitting hole 20a is formed in the bottom plate 30 to correspond to the bottom surface of the recessed section 20. In addition, the leg portions 15a each having the stepped portion are unitarily formed on the bottom surface of the front end portion of the bottom plate 30. At this time, the engagement portions 15b, the projections 15c, and the hooks 33 are unitarily formed on the bottom plate 30, in the bottom surface of the rear seat 15.

Then, the outer cover member 32 is placed over the rear seat body section of the rear seat 15. FIG. 8 is a perspective view showing a state in which the outer cover member 32 is placed over the bottom plate 30 of the rear seat 15. As shown in FIG. 8, the cushion member is placed on the bottom plate 30 to correspond to the rear seat body section, and covered with the outer cover member 32.

Finally, the plate 31 is placed on the bottom surface of the recessed section 20 of the rear seat 15, and fastened to the bottom plate 30 by the rivets R. Thus, manufacturing of the rear seat 15 is completed. As shown in FIG. 5, the side surface of the recessed section 20 of the rear seat 15 is inclined. In the present embodiment, the plate 31 is fastened to the bottom surface of the recessed section 20 in such a manner that the end portion of the outer cover member 32 located in the recessed section 20 is pressed by the plate 31 and fastened by the rivets R. In this way, the outer cover member 32 is tensed so as not to be slack along the inclined surface of the recessed section 20, and fastened to the recessed section 20.

Figure 9:
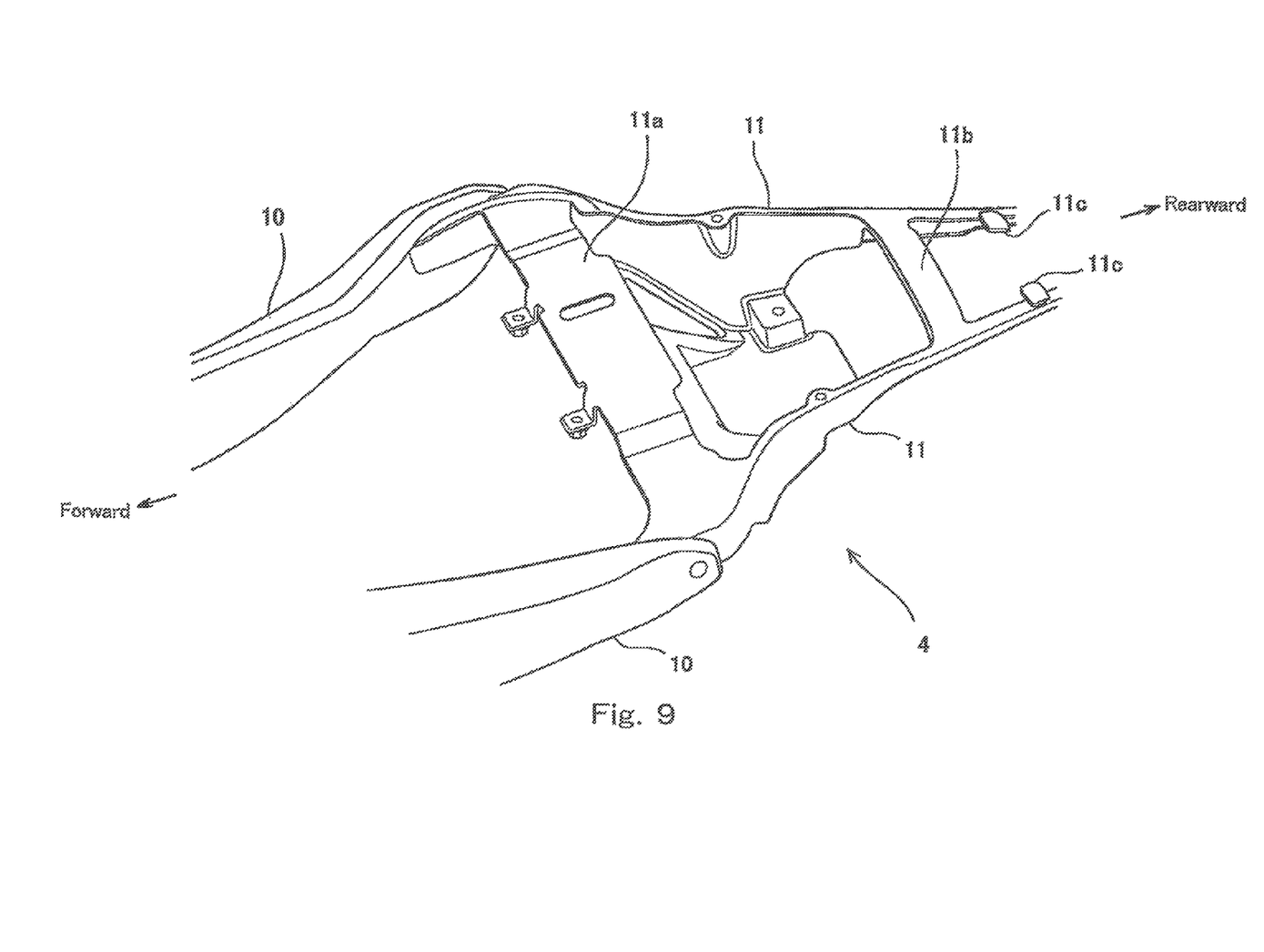
FIG. 9 is a perspective view showing a portion of a vehicle body frame of the motorcycle of FIG. 1.

FIG. 9 is a perspective view showing a portion of the vehicle body frame 4 of the motorcycle of FIG. 1. As shown in FIG. 9, the right and left seat rails 11 extending in the forward and rearward direction of the vehicle body are connected to the right and left pivot frames 10, respectively. The seat rails 11 include the first cross member 11a connecting the right and left front end portions of the seat rails 11 to each other, and a second cross member 11b connecting the right and left center portions of the seat rails 11. The seat rails 11 have a frame shape when viewed from above. The first cross member 11a has in a center portion thereof a through-hole communicated with the engagement hole of the seat lock device 21. Engagement portions 11c are provided on the right and left rear end portions of the seat rails 11, respectively.

Figure 10:
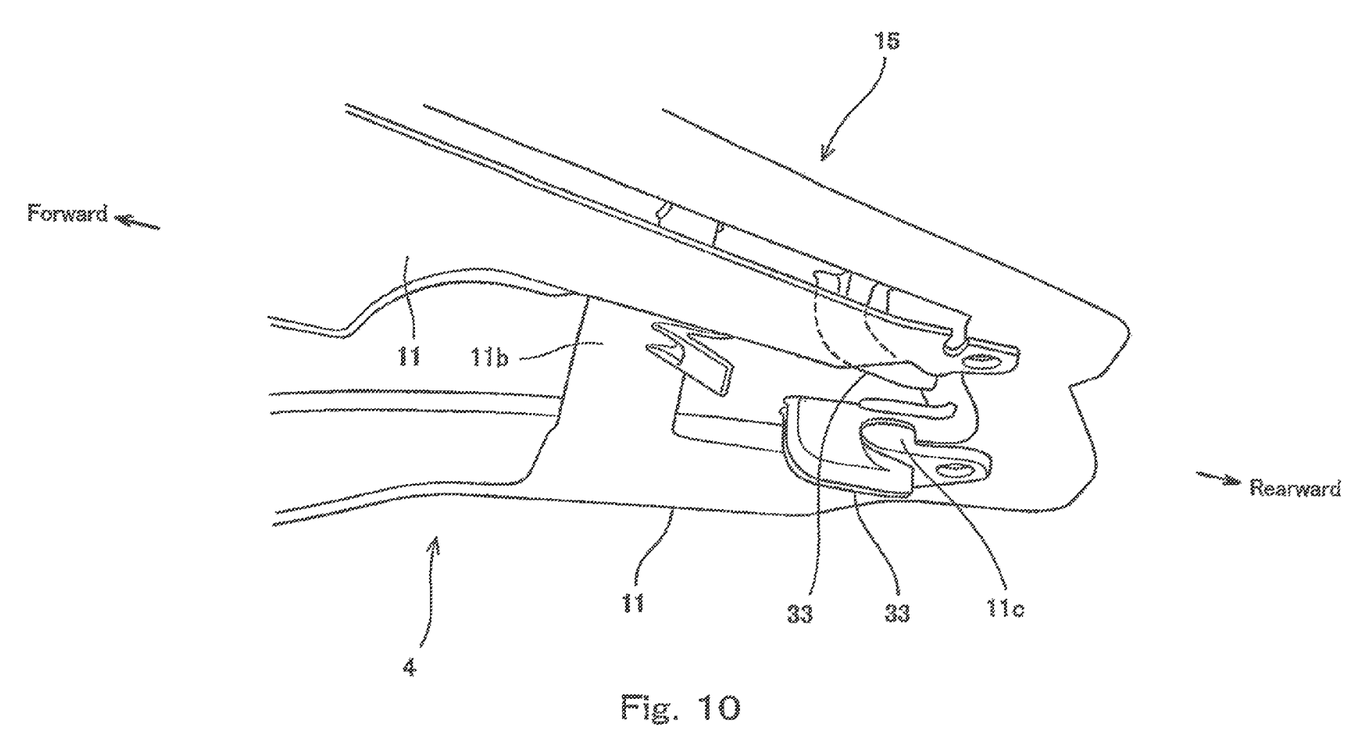
FIG. 10 is a perspective view showing the rear portion of the rear seat engaged with the vehicle body frame of FIG. 9, when viewed obliquely from below.
Figure 11:
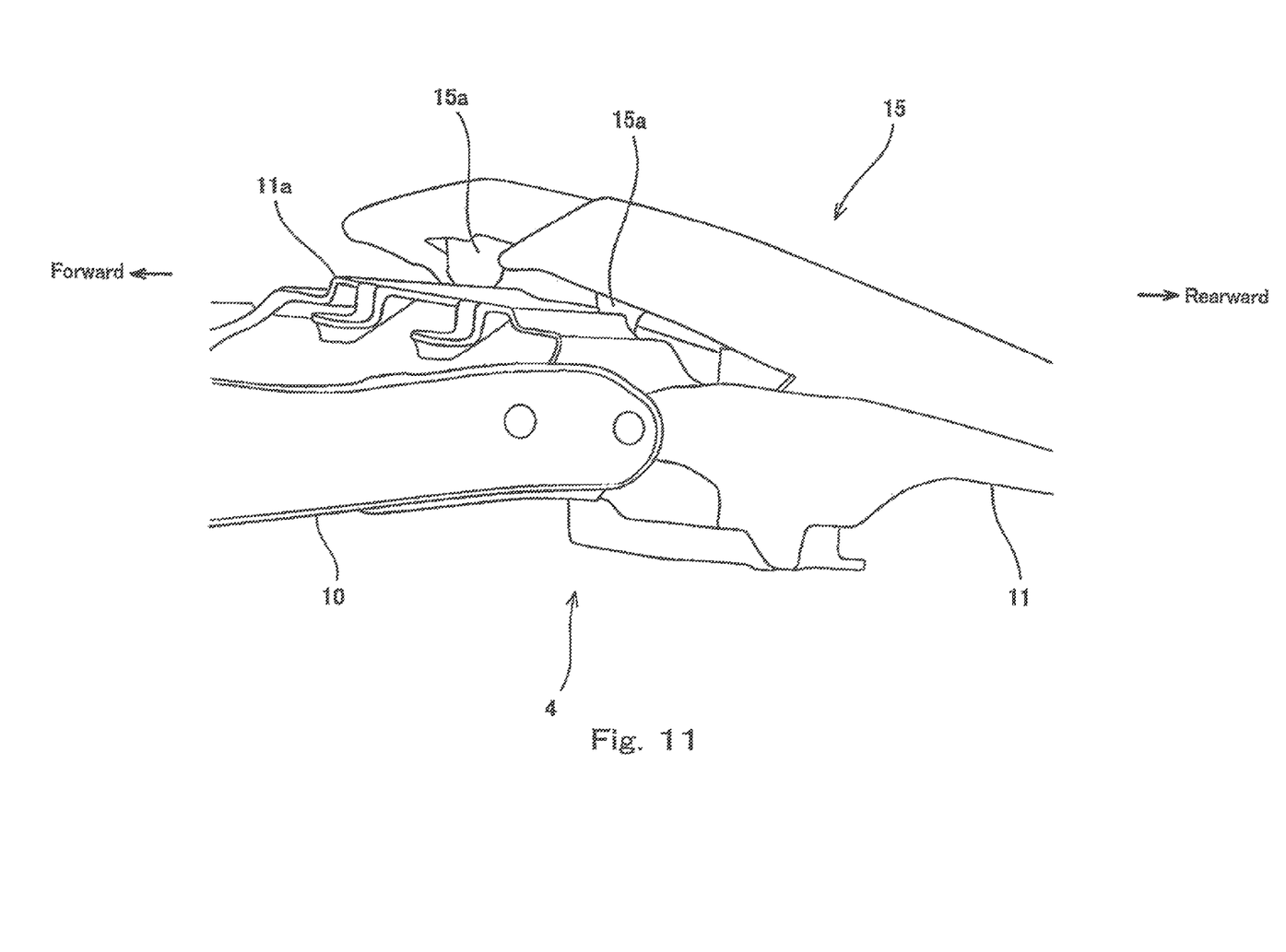
FIG. 11 is a perspective view of the front portion of the rear seat placed over the vehicle body frame of FIG. 9, when viewed obliquely from a side.
Figure 12:
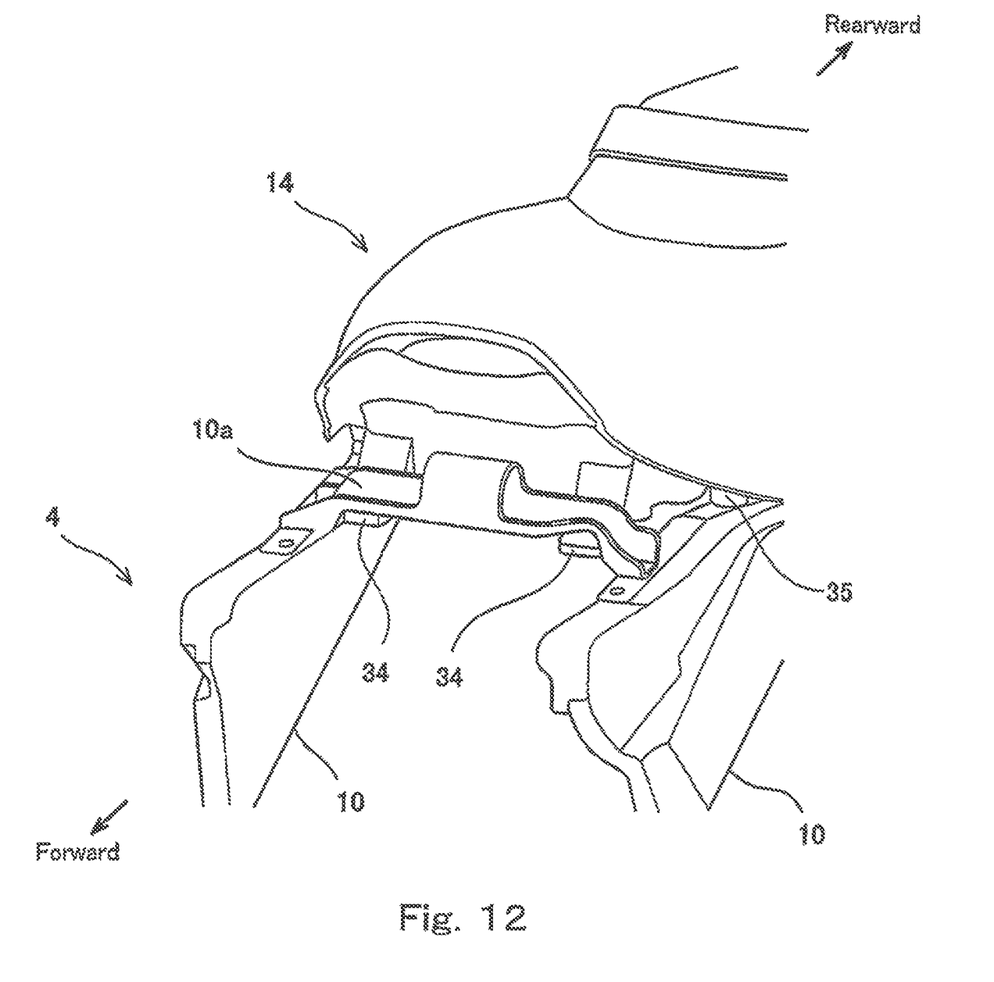
FIG. 12 is a perspective view of the front portion of the front seat engaged with the vehicle body frame of FIG. 9, when viewed obliquely from above.

Now, the procedure for mounting the front and rear seats to the vehicle body frame 4 will be described with reference to FIGS. 10 to 12. Initially, the rear portion of the rear seat 15 is engaged with the vehicle body frame 4. FIG. 10 is a perspective view showing the rear portion of the rear seat 15 engaged with the vehicle body frame 4 of FIG. 9, when viewed obliquely from below. As shown in FIG. 10, the two hooks 33 are provided on the bottom surface of the rear end portion of the rear seat 15. The engagement portions 11c at the rear end portions of the seat rails 11 are engaged with the hooks 33, respectively, to engage the rear portion of the rear seat 15 with the vehicle body frame 4.

Then, the front portion of the rear seat 15 is placed over the vehicle body frame 4. FIG. 11 is a perspective view of the front portion of the rear seat placed over the vehicle body frame, when viewed obliquely from a side. As shown in FIG. 11, the two leg portions 15a each having the stepped portions, which are provided on the bottom surface of the front end portion of the rear seat 15, are placed over the first cross member 11a connecting the right and left front end portions of the seat rails 11.

At this time, the engagement portions 15b (see FIG. 6) which are provided on the bottom surface of the rear seat 15 in the location that is slightly forward relative to the center in the forward and rearward direction, are engaged with the seat rails 11 to position the rear seat 15, in the rightward and leftward direction, and the projections 15c (not shown) which are provided on the bottom surface of the rear seat 15 in the location that is slightly rearward relative to the center in the forward and rearward direction, are placed over the seat rails 11, respectively, to set the height of the rear seat 15.

Then, the front portion of the front seat 14 is engaged with the vehicle body frame 4. FIG. 12 is a perspective view of the front portion of the front seat 14 engaged with the vehicle body frame 4, when viewed obliquely from above. As shown in FIG. 12, the pivot frames 10 include a third cross member 10a connecting the right and left upper portions thereof. Two hooks 34 are provided on the bottom surface of the front portion of the front seat 14. The hooks 34 are engaged with the third cross member 10a to engage the front portion of the front seat 14 with the vehicle body frame 4. Rubber dampers 35 are provided on the bottom surfaces of the side portions of the front seat 14. The bottom surfaces of the side portions of the front seat 14 are placed on the pivot frames 10 via the rubber dampers 35, respectively.

Finally, the rear portion of the front seat 14 is pressed on the front portion of the rear seat 15. As shown in FIG. 2, in a state in which the front portion of the rear seat 15 is placed over the seat rails 11 from above such that the front portion of the rear seat 15 is movable upward from the seat rails 11, the protruding section 17 of the front seat 14 is accommodated into the recessed section 20 of the rear seat 15 and presses the recessed section 20 from above, and the front seat 14 is locked by the seat lock device 21. In this way, the operation for mounting the front and rear seats is completed.

In the above described manner, the front portion of the rear seat 15 is retained by the protruding section 17 of the front seat 14 without being fastened to the seat rails 11. Therefore, the mounting structure of the rear seat 15 can be simplified, and the rear seat 15 can be mounted more easily. Since the front seat 14 and the rear seat 15 which are separate members overlap with each other, they have an external appearance without discontinuity. Thus, the external appearance of the front and rear seats can be improved.

Numerous improvements and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

INDUSTRIAL APPLICABILITY

The present invention can be used in a motorcycle including a separate seat.

REFERENCE CHARACTER LIST 1 motorcycle
4 vehicle body frame
6 head pipe
8 main frame
10 pivot frame
11 seat rail
14 front seat
15 rear seat
16 front seat body section
17 protruding section
17a upward protruding portion
17b extending portion
18 seat band
19 rear seat body section
20 recessed section
20a fitting hole
21 seat lock device
22 front seat bottom plate
23 reinforcement plate
24 fastening member

The invention claimed is:
1. A motorcycle comprising:
a vehicle body frame;
a front seat including a front seat body section on which a rider is to be seated, and a protruding section protruding rearward from the front seat body section;
a rear seat located higher than the front seat and including a rear seat body section on which a passenger is to be seated, and a recessed section which is provided in a front portion of the rear seat body section and opened upward and forward; and
a seat lock device mounted to the vehicle body frame, wherein the protruding section includes an upward protruding portion protruding rearward and upward from the front seat body section, and an extending portion protruding rearward from the upward protruding portion at an angle with respect to a horizontal direction which is smaller than an angle of the upward protruding portion with respect to the horizontal direction, and in a state in which a front portion of the rear seat is placed over the vehicle body frame from above such that the front portion of the rear seat is movable upward from the vehicle body frame, the extending portion of the front seat is accommodated into the recessed section of the rear seat and presses the recessed section from above, and the front seat is locked by the seat lock device.

2. The motorcycle according to claim 1, wherein the front seat includes a bottom plate made of a resin, and a reinforcement plate made of metal and fastened to a portion of the bottom plate to correspond to at least the protruding section.

3. The motorcycle according to claim 1, wherein a seat band which is to be gripped by a passenger is attached to the protruding section of the front seat.

4. The motorcycle according to claim 3, wherein the front seat includes a bottom plate made of a resin, and a reinforcement plate made of metal and fastened to a portion of the bottom plate to correspond to at least the protruding section, and wherein the seat band, the reinforcement plate, and the bottom plate are fastened together by a common fastening member.

5. The motorcycle according to claim 1, wherein the protruding section is provided on a lower surface thereof with a projection projecting downward, and the recessed section has a fitting hole into which the projection is fitted.

6. The motorcycle according to claim 1, wherein the extending portion and the recessed section have a V-shape when viewed from above, with a width decreased in a rearward direction.

* * * * *